(12) United States Patent
Baudson et al.

(10) Patent No.: US 9,443,435 B2
(45) Date of Patent: Sep. 13, 2016

(54) VISION SYSTEM FOR AN AIRCRAFT APPROACHING A LANDING RUNWAY AND ASSOCIATED VISION METHOD

(71) Applicant: DASSAULT AVIATION, Paris (FR)

(72) Inventors: Olivier Baudson, Paris (FR); Arnaud Turpin, Boulogne (FR)

(73) Assignee: DASSAULT AVIATION, Paris (FR)

( * ) Notice: Subject to any disclaimer, the term of this patent is extended or adjusted under 35 U.S.C. 154(b) by 298 days.

(21) Appl. No.: 14/044,305

(22) Filed: Oct. 2, 2013

(65) Prior Publication Data
US 2014/0097973 A1    Apr. 10, 2014

(30) Foreign Application Priority Data

Oct. 5, 2012   (FR) ...................................... 12 02675

(51) Int. Cl.
*G08G 5/00*      (2006.01)
*G06T 19/00*     (2011.01)

(52) U.S. Cl.
CPC .......... *G08G 5/0047* (2013.01); *G06T 19/006* (2013.01)

(58) Field of Classification Search
CPC .... G08G 5/00; G08G 5/0047; G08G 5/0073; G08G 5/0095; G08G 5/02; B64D 45/00; B64D 45/04; B64F 1/18; G06T 19/006
USPC ................................................. 340/971–980
See application file for complete search history.

(56) References Cited

U.S. PATENT DOCUMENTS

| 2010/0113149 | A1* | 5/2010 | Suddreth ................ G01C 23/00 463/31 |
| 2013/0041529 | A1* | 2/2013 | He ......................... G08G 5/025 701/17 |

OTHER PUBLICATIONS

Ververs, Patricia M.,"Design and Flight Test of Primary Flight Display Combined Vision System," SAE International Technical Papers—Int. Jour. Aerospace (Oct. 18, 2011), pp. 738-750.
Calhoun, Gloria, et al. "Synthetic Vision System for Improving Unmanned Aerial Vehicle Operator Situation Awareness," (May 2005), Enhanced and Synthetic Vision, SPIE, pp. 219-230.
Mckenna Ed, "Synthetic Vision Systems," Avionics Magazine (May 1, 2002), retrieved from URL: http:www.aviationtoday.com/av/issue/feature/synthetic-vision-systems_76212.htm.

(Continued)

*Primary Examiner* — Brian Wilson
(74) *Attorney, Agent, or Firm* — Davidson, Davidson & Kappel, LLC

(57) ABSTRACT

The system according to the invention comprises an assembly for managing the graphic interface of a display, capable of controlling the display, on at least a first region of the display, of a peripheral area formed by a synthetic image comprising at least one synthetic surface representation of the terrain, and capable of maintaining at least one area representative of the position of a landing runway, centered on the landing runway, and at least one front area, adjacent to the center area, substantially free of any synthetic surface representation of the terrain. The management assembly includes means for dynamically defining the length (L) of the front area on the display as a function of a vertical decision position (DP) associated with a selected approach for said landing runway.

17 Claims, 4 Drawing Sheets

(56) References Cited

OTHER PUBLICATIONS

Bailey, R., et al."Crew and Display Concepts evaluation for synthetic/enhanced vision systems," Proceedings of the SPIE—The International Society for Optical Engineering SPIE—Int. Soc. Opt. Eng. USA, vol. 6226, No. 1 May 20, 2006).

Search Report for French Application No. FR 12 02675, dated Jun. 10, 2013.

* cited by examiner

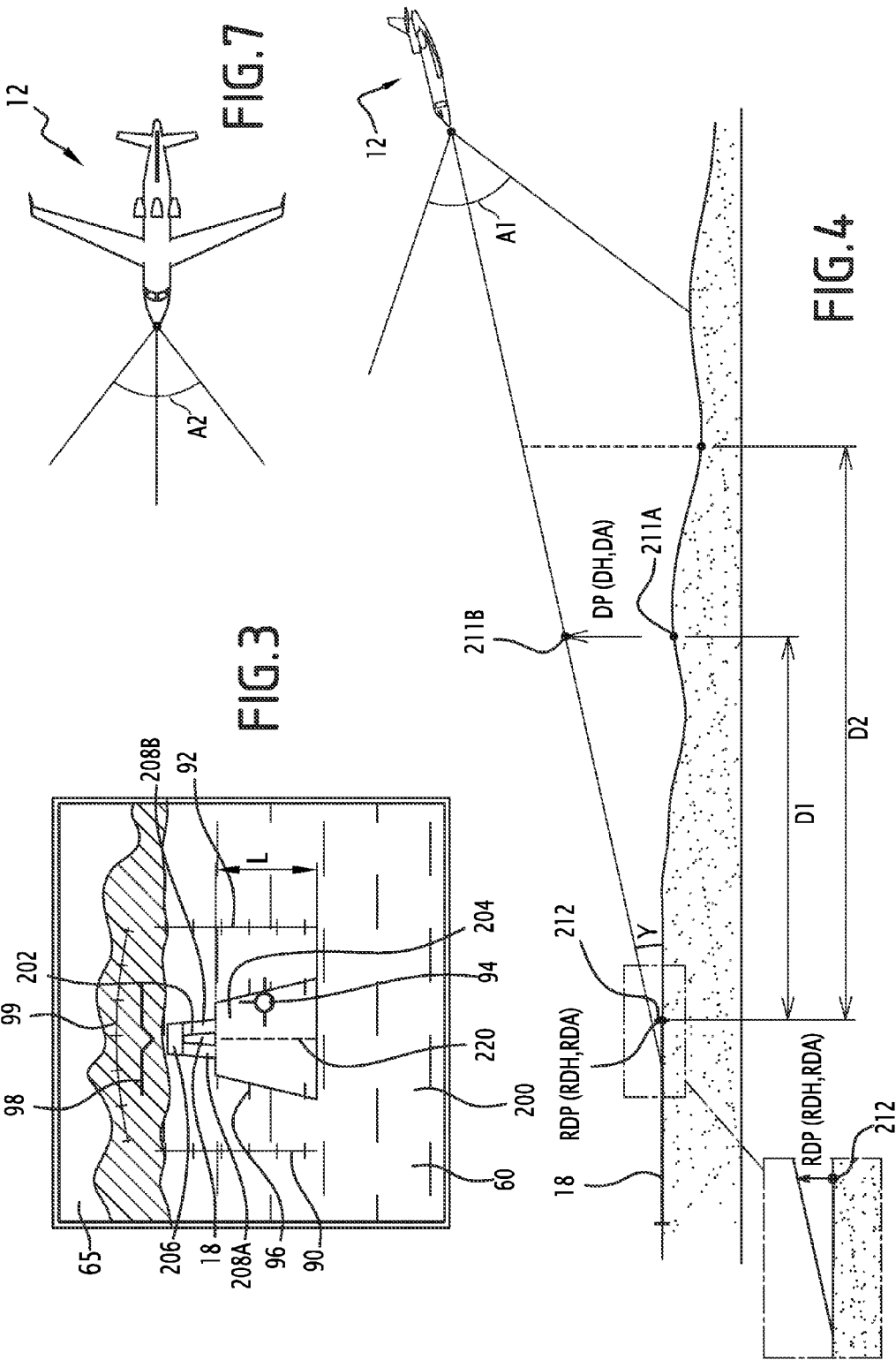

VISION SYSTEM FOR AN AIRCRAFT APPROACHING A LANDING RUNWAY AND ASSOCIATED VISION METHOD

CROSS-REFERENCE TO RELATED APPLICATIONS

This application claims benefit of French patent application serial number FR 12 02675, filed Oct. 5, 2012, which is herein incorporated by reference.

BACKGROUND OF THE INVENTION

1. Field of the Invention

The present invention relates to a vision system for an aircraft, comprising:

a display;

an assembly for dynamically generating synthetic images, the synthetic images comprising at least one synthetic surface representation of the terrain situated facing the aircraft;

a management assembly for the graphic interface of the display, capable of controlling the display, on at least a first region of the display, of a peripheral area formed from a synthetic image comprising at least one synthetic surface representation of the terrain coming from the synthetic image generating assembly;

the management assembly being capable of maintaining at least one area representative of the position of a landing runway, centered on the landing runway and at least one front area, adjacent to the centered area, substantially with no synthetic surface representation of the terrain, the peripheral area extending at least partially around the centered area and/or the front area.

2. Description of the Related Art

Such a system is designed to be installed in the cockpit of an aircraft to be associated with a display of the cockpit. The display is for example an at least partially transparent display, such as a semitransparent screen placed in front of the windshield of the cockpit, a system for projecting images on the windshield of the cockpit, a semitransparent sunshade, a helmet visor, or semitransparent glasses close to the eye. Alternatively, the display is a head-down screen integrated into the dashboard of the cockpit.

To facilitate piloting the aircraft, and to give the pilot overall information on the structure of the terrain situated in front of the aircraft, it is known to generate synthetic images of the countryside situated in front of the aircraft, in particular from topographical databases, based on the current position of the aircraft determined by the aircraft's navigation system.

The synthetic images are representative of the environment situated in front of the airplane, as it may be observed through the windshield by a pilot in the cockpit. These synthetic images generally comprise a synthetic surface representation of the terrain.

Such a vision system allows the pilot to visualize the relief that may be located in front of the aircraft, in particular when visibility is low or nonexistent.

Such vision systems provide substantial assistance to pilots, but are sometimes inaccurate, in light of possible errors in the positioning of the aircraft and/or in the topographical data available in the databases. It is therefore necessary to have, in parallel, a real vision of the environment located outside the aircraft.

To that end, enhanced vision systems (EVS) have been developed.

These systems generally comprise a camera placed onboard in the nose cone of the aircraft. The camera, which for example includes sensors operating in the infrared, improves the visibility in front of the aircraft, by detecting the terrain and all structures present on the terrain, for example such as lights present on the runway or around the runway, in particular approach ramp lights.

Based on the image data collected by the camera, a real image of the environment present in front of the aircraft is obtained.

Such vision systems therefore make it possible to confirm the position of the runway relative to the aircraft and/or relative to the environment, and facilitate the pilot's decision when he reaches the decision altitude, at which he must choose whether or not to continue landing.

Hybrid vision systems have also been developed. These systems display both a first region comprising a completely synthetic image, and a second region comprising a real image obtained from an enhanced vision system comprising an infrared camera.

Such a system therefore provide substantial assistance to the pilot in identifying the runway on which he will land. However, the length of the front area on the screen is small, such that the assistance provided to the pilot comes only in the final phase of landing, near the runway, when the pilot has already exceeded the decision height.

Such a system is therefore not fully satisfactory. In fact, when the pilot approaches the runway, but is located at a substantial distance therefrom, the view offered by the system is essentially based on an artificial image, except in the front area adjacent to the runway, over a very small length. The pilot therefore cannot see certain visual details, in particular when he reaches the decision height, at which time he must be able to have a sufficient view of the runway to be able to decide whether he will continue landing or go around.

SUMMARY OF THE INVENTION

One aim of the invention is therefore to obtain a vision system that facilitates the pilot's task, in order to determine whether or not he will continue with landing, during an approach phase.

To that end, the invention relates to a vision system of the aforementioned type, characterized in that the management assembly includes means for dynamically defining the length of the front area of the display as a function of a vertical decision position, advantageously the decision height or decision altitude, associated with a chosen approach for said landing runway.

The system according to the invention may comprise one or more of the following features, considered alone or according to any technically possible combinations:

it includes at least one database associating each approach on each landing runway from among a plurality of approaches over a plurality of landing runways with a vertical decision position corresponding to said approach on said landing runway, the means for defining the length of the front area on the display being capable of collecting the information relative to the vertical decision position associated with said approach on said landing runway situated facing the aircraft, from the database;

the means for defining the length of the front area on the display comprise first means for computing a topographical distance depending on the topographical approach distance designed to horizontally separate the aircraft, at the vertical decision position corresponding to said approach, of the landing runway, and second means for computing the length of the front area on the display as a function of the topographical distance;

the second computation means are able to compute the topographical distance as a function of a multiple of the approach distance, the multiple being comprised between 1 and 3, advantageously between 1.2 and 1.8;

the management assembly is capable of keeping at least one side area and at least one rear area situated around the center area free of any synthetic surface representation;

the front area has a larger width than the width of the centered area;

it includes an assembly for generating real images of the terrain situated facing the aircraft, comprising at least one detection sensor, the management assembly being capable of controlling the dynamic display, in the front area and/or the centered area, of a real image of the terrain situated facing the aircraft, simultaneously with the display of a synthetic image in the peripheral area;

the management assembly is capable of maintaining the peripheral area free of real images created by the real image generating assembly;

the management assembly is capable of maintaining, in certain movement configurations of the aircraft, a second region of the display delimited by an edge of the first region, free of any synthetic surface representation of the terrain;

the display is an at least partially transparent display, such as a semitransparent screen placed in front of the windshield of the cockpit, a system for projecting images on the windshield of the cockpit, a semitransparent sunshade, a helmet visor or semitransparent glasses close to the eye;

it includes a member for adjusting the opaqueness of the display, advantageously situated on a control lever of the aircraft, such as the control stick or the throttle.

The invention also relates to a vision method in an aircraft, comprising the following steps:

providing a system as described above;

using the management assembly to display, in at least a first region of the display, a peripheral area including a synthetic image coming from the synthetic image generating assembly, the synthetic images including a synthetic surface representation of the terrain;

at least one area representative of the position of the landing runway, centered on the landing runway and at least one front area, adjacent to the centered area having no synthetic surface representation of the terrain;

dynamically defining the length of the front area on the display as a function of the vertical decision position associated with an approach of said runway.

The method according to the invention may comprise one or more of the following features, considered alone and according to any technically possible combinations:

a step, using the means for defining the length of the front area on the display, for collecting a vertical decision position associated with said landing runway in at least one database associating a vertical decision position with each approach on each landing runway from among a plurality of approaches on a plurality of landing runways;

the step for defining the length of the front area on the display includes computing an approach distance intended to horizontally separate the aircraft from the vertical decision position associated with the approach of the landing runway, and computing the length of the front area on the display as a function of the computed approach distance, in particular as a function of a multiple of the computed approach distance comprised between 1 and 3, advantageously between 1.2 and 1.8;

it includes a step for acquiring real image data by at least one real image generating assembly, then generating a real image from image data taken by the real image generating assembly, the method including the display, by the management means, of a real image obtained from the real image generating assembly in the centered area and/or in the front area;

the management assembly maintains, in certain movement configurations of the aircraft, a second region of the display delimited by an edge of the first region, free of any synthetic surface representation of the terrain.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The invention will be better understood upon reading the following description, provided solely as an example, and done in reference to the appended drawings, in which:

FIG. 3 is a view of a display of the system of FIG. 1, in a first display configuration during a viewing method according to the invention;

FIG. 4 is a diagrammatic view of the movement of the aircraft in the first configuration;

FIG. 7 is a top view of the aircraft during its movement;

DETAILED DESCRIPTION

Figure 1:
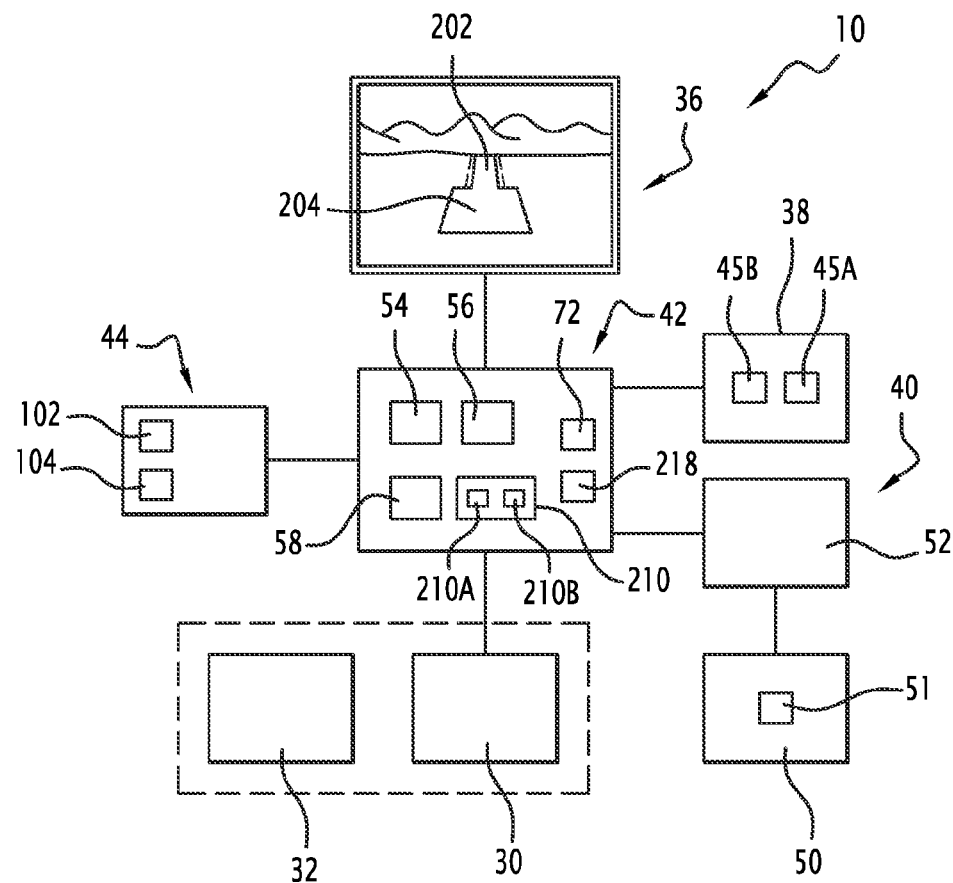
FIG. 1 is a diagrammatic view of a vision system of an aircraft according to the invention.

A first vision system 10 for an aircraft 12 according to the invention is diagrammatically illustrated by FIG. 1.

Figure 2:
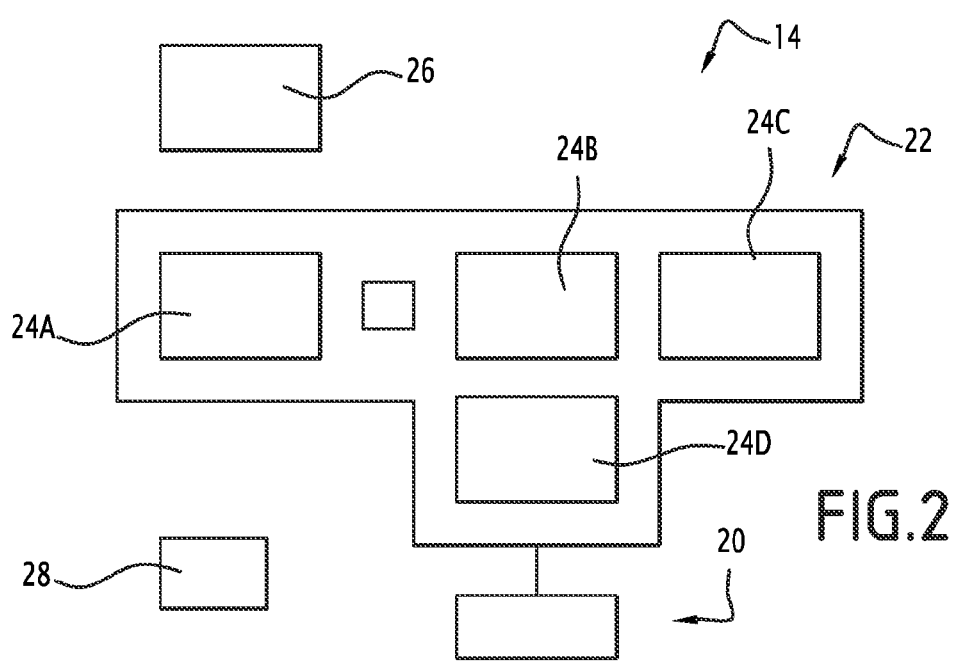
FIG. 2 is a diagrammatic view of a cockpit in which the vision system is installed.
Figure 5:
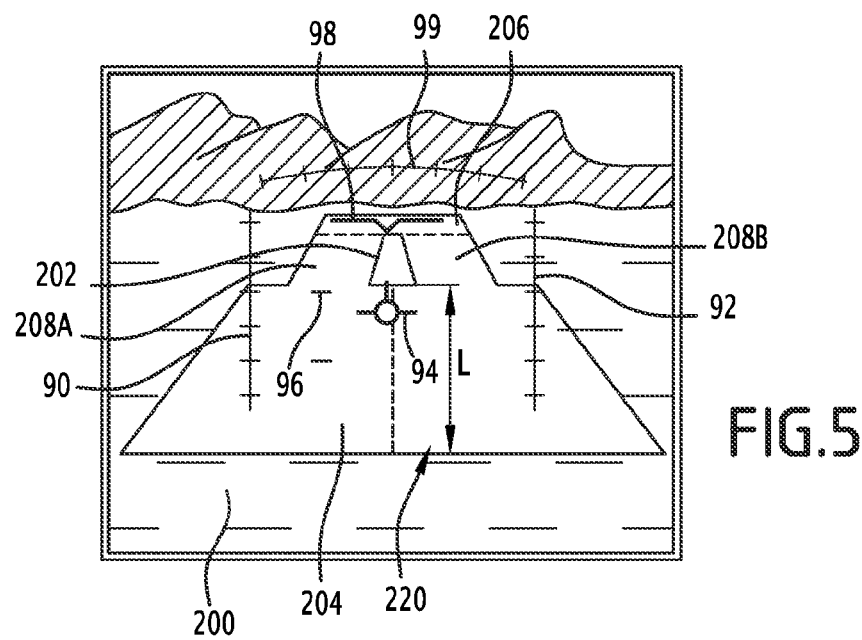
FIG. 5 is a view similar to FIG. 4 when the aircraft is approaching the runway.

The system 10 is designed to be mounted in an aircraft 12 diagrammatically shown in FIG. 4, to allow the display of information on the display present in the cockpit 14 of the aircraft, diagrammatically shown in FIG. 2.

The system 10 is designed to assist the pilot of the aircraft in visualizing the terrain 16 situated facing the aircraft 12, and in particular near a landing runway 18 present on the terrain 16.

In reference to FIG. 2, the cockpit 14 is provided with a primary display system 22 connected to a central avionics unit 20.

The primary system 22 allows the crew to pilot the aircraft, manage its navigation, and monitor and control the various functional systems present in the aircraft. The system 22 includes a dashboard provided with a plurality of base screens 24A to 24D forming head-down displays.

In this example, the cockpit 14 is also advantageously provided with a semitransparent head-up display 26, placed facing the windshield. The cockpit 14 is also provided with a control member 28 for piloting the aircraft, such as a lever or control stick.

In a known manner, the base screens 24A and 24C are for example primary display screens designed to display flight parameters of the aircraft. The base screens 24B and 24D are for example multifunctional navigation and/or monitoring and control screens of the avionics systems.

The primary display system 22 is provided with a display management assembly (not shown) capable of displaying the different windows present on the screens 24A to 24D.

The central avionics unit 20 is connected to a measurement and spatial positioning system 30 of the aircraft 12 and, advantageously, to an external communication system 32, in particular for guiding the aircraft in its approach toward the landing runway 18.

The measuring and positioning system 30 for example includes sensors measuring parameters outside the aircraft such as the temperature, pressure or speed, sensors measuring parameters inside the aircraft and its various functional systems, and positioning sensors, such as GPS sensors, inertial measurement units and/or an altimeter.

The positioning sensors are capable of providing information on the geographical position of the aircraft, its speed, its heading and its attitude (pitch attitude, roll angle).

The external communication system 32 for example includes radio VOR/LOC, ADS, DME, ILS, MLS systems and/or radar systems for managing and guiding the approach toward the runway 18.

In reference to FIG. 1, the vision system 10 according to the invention is connected to the measurement and positioning system 30. It is advantageously connected to the central avionics unit 20.

The vision system 10 includes at least one display 36, an assembly 38 for generating synthetic images, and advantageously, an assembly 40 for generating real images.

It also includes a management assembly 42 of the graphic interface of the display 36 connected to each of the assemblies 38, 40 and the positioning system 30.

The system 10 further includes a man-machine interface 44 for adjusting the parameters of the display on the display 36.

The display 36 is for example one of the screens 24A to 24B and/or is the semitransparent head-up display 26 of the cockpit 14. Alternatively, the display 36 is a system for projecting images on the windshield of the cockpit, a semitransparent sunshade, a helmet visor or semitransparent glasses close to the eye.

In a first embodiment that will be described hereafter, the display 36 of the vision system 10 according to the invention is the semitransparent head-up display 26 of the cockpit 14.

In that case, the display 36 can be made partially transparent to allow viewing of the environment situated in front of the display 36, transparently. The display 36 can be made at least partially opaque by displaying synthetic images or real images generated by one of the generating assemblies 38, 40, and provided by the management assembly 42, as will be described below.

The dimensions of the display 36 correspond to an observation volume 44A in the space situated in front of the aircraft 12, defined substantially by a pyramid.

In reference to FIG. 4 and FIG. 7, the observation volume 44A has a vertical opening angle, along a vertical axial plane of the aircraft 12, equal to A1 and a horizontal opening angle equal to A2 in a horizontal axial plane of the aircraft in a reference related to the aircraft 12.

The opening angle A1 is defined while excluding the regions of the terrain 16 that are not visible by the pilot due to the structure of the cockpit and the pitch attitude of the aircraft 12.

The assembly 38 for generating synthetic images is connected to the management assembly 42. It includes a memory and a processor.

It includes at least one database 45A contained in the memory comprising topographical data associated with the terrain above and in front of which the aircraft 12 is moving.

It further includes a model 45B for generating images, capable of dynamically creating synthetic images of the terrain situated facing and in front of the aircraft, based on the current geographical position of the aircraft 12, and its attitude (in particular heading, pitch attitude, pitch angle, yaw), as determined using the positioning system 30 and based on the topographical data coming from at least one of the databases 45A.

To that end, the database(s) 45A are chosen from among terrain, obstacle, navigation, geopolitical, airspace usage, and terrain type (expanses and streams of water, land areas, etc.) databases.

The module 45B is thus capable of creating, at any given moment, a synthetic surface image that corresponds to a visual representation of the environment that could be observed by the pilot through the windshield at that given moment, when the aircraft is in a given geographical position and attitude.

The synthetic image can partially cover the observation volume 44A defined by the dimensions of the display 36.

It in particular forms a synthetic surface representation of the terrain present in front of the aircraft and its relief.

This representation, in two dimensions on the display 36, makes up at least one of the regions of the display 36 in the form of filled surfaces that correspond to terrain areas and/or the relief present in those areas.

The synthetic image of the terrain may comprise aeronautic data such as airports and their landing runways and/or geographic references such as towns or expanses of water (rivers, lakes, seas).

The filling of the synthetic image with opaque or partially opaque pixels is advantageously greater than 50% of the total surface area of the image.

In the example illustrated in FIG. 1, the aircraft 10 further includes an assembly 40 for generating real images in front of the aircraft.

This generating assembly 40 includes at least one optical measuring sensor 50, such as a camera 51, and a module 52 for generating real images connected to the sensor 50.

Alternatively, the assembly 40 includes a plurality of sensors 50 operating at different wavelengths.

The sensor 50 is for example a visible or infrared camera or a camera in the millimetric domain that is mounted on or near the nose cone of the aircraft 12.

The assembly 40 for generating real images is calibrated to observe the space situated in front of the aircraft 12 in a viewing field preferably corresponding to the observation volume 44A. It is capable of measuring and dynamically providing the module 52 with periodic image data observed at a given resolution in its viewing field.

The module 52 is capable of dynamically processing the periodic image data received from the or each sensor 50 to form a real image at each moment, obtained from image data detected by the or each sensor 50, to be displayed on the display 36.

The assembly 42 for managing the interface for example includes a processor 54 and a memory 56. It includes means 58 for managing the display of images on the display 36.

In reference to FIG. 3, the management means 58 of the display on the display can dynamically display, in at least a first region 60 of the display 36, a first peripheral area 200 including a synthetic image coming from the synthetic image generating assembly 38. The synthetic image comprises at least one synthetic surface representation of the terrain 16 situated facing the aircraft 12.

The management means 58 are capable of maintaining at least one first area 202 representative of the position of the runway 18, centered on the runway 18, at least one front area 204, adjacent to the centered area, advantageously a rear area 206, and two side areas 208A, 208B, respectively behind the centered area 202 and on the sides of the center area 202, free of any synthetic surface representation of the terrain 16.

The management means 58 are capable of converting the topographical position of the runway 18 on the terrain, for example obtained from the database 45A, into a local position on the display 36.

Thus, the centered area 202 corresponds to the position on the display 36 of the contour of the runway 18, as it is defined by the topographical data coming from the synthetic image generating assembly 38. The contour of the centered area 202 is advantageously embodied by a line.

The side areas 208A, 208B with no synthetic surface representation of the terrain 16 on the display 36 are representative of peripheral regions 208A, 208B situated around the runway 18. These regions 208A, 208B respectively have a topographical width DB taken from the periphery of the runway, shown in FIG. 6, with the same numerical references as those of FIG. 3.

The topographical width DB is for example comprised between 5 m and 5,000 m.

Advantageously, the rear area 206 also corresponds to a topographical region with a topographical length DA situated at the rear of the runway 18.

The length DA is for example comprised between 5 m and 5,000 m.

According to the invention, the management assembly 42 includes means 210 for dynamically defining the length L of the front area 204 on the display 36 as a function of a vertical decision position DP associated with a given approach on the runway 18.

The vertical decision position DP is for example the decision altitude DA, or the decision height DH.

The decision altitude DA is referenced relative to sea level. It is generally calculated from a pressure altitude obtained from a pressure altimeter.

The decision height DH is referenced relative to the level of the runway threshold 18. It is generally calculated from an altitude measured from a radio altimeter.

The vertical decision position DP (either the decision altitude DA, or the decision height DH) associated with a given approach on each runway 18 is tabulated data, for example in a referenced document accessible to the pilot, or in a database 45A associated with the navigation system and/or the generating assembly 38.

In the database, each approach on each runway 18 present on the terrain 16 is associated with at least one vertical decision position DP (either the decision altitude DA, or the decision height DH) corresponding to said runway 18.

This vertical decision position DP generally corresponds to the minimum vertical position (minimum altitude relative to sea level for the decision altitude DA, minimum height relative to the runway threshold for the decision height DH) below which the pilot, during the final approach, must go around, if he does not have all of the necessary visual references to continue the descent.

This minimum vertical position depends on the equipment present on the ground associated with the considered approach on the runway 18, the corresponding equipment of the communication system 32 of the aircraft 12 (for example GPS, ILS, VOR, etc.), the certification of the aircraft 12 to perform a given approach, and/or the corresponding qualification of the crew.

The decision height DH is for example comprised between 0 feet and 200 feet (or approximately 61 m) above the runway threshold. The decision altitude DA is for example comprised between 100 feet (i.e., approximately 30.5 m) and 1,000 feet (i.e., approximately 305 m).

Figure 6:
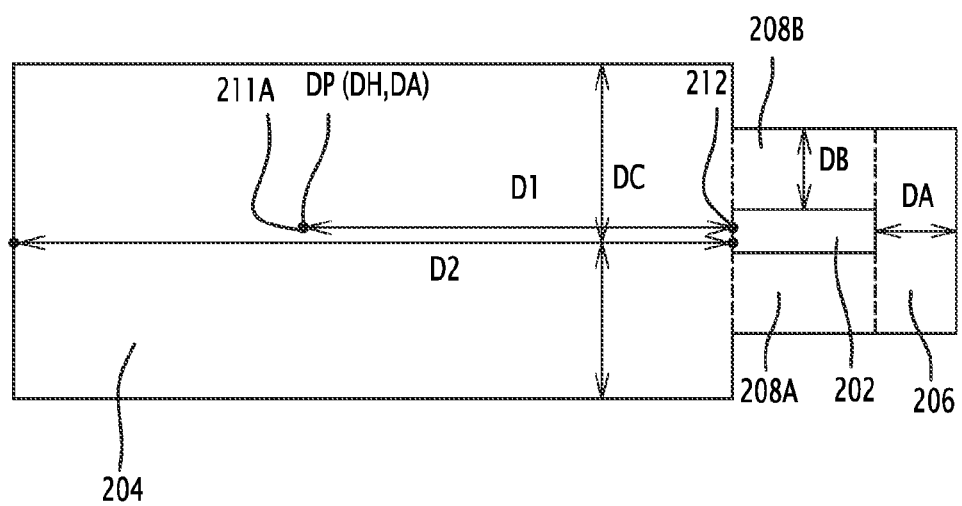
FIG. 6 is a diagrammatic top view illustrating the topographical position of the different zones with no synthetic image on the terrain.

In reference to FIGS. 4 and 6, the dynamic definition means for example comprise first means 210A for computing a topographical distance D2, corresponding to the topographical length of the front area 204, as a function of the topographical approach difference D1 horizontally separating the runway threshold 212 and the projection 211A from the theoretical position 211B of the aircraft 12 in the vertical decision position DP on a horizontal ray passing through the runway threshold 212.

The means 210 further include second means 210B for computing the length L of the front area 204 on the display 36 as a function of the topographical distance D2.

As illustrated by FIG. 4, the computation means 210A are capable of computing the topographical approach distance D1 horizontally separating the runway threshold 212 and the projection 211A from the theoretical position 211B of the aircraft 12 in the vertical decision position DP on a horizontal ray passing through the runway threshold 212.

The computation means 210A are capable of querying the database 45A to collect the vertical decision position DP corresponding to the approach chosen on the runway 18, the desired descent slope γ, the topographical position of the threshold 212 of the runway 18, and optionally, the desired vertical reference position RDP at the threshold 212, i.e., the reference altitude at the threshold RDA, or the reference height at the threshold RDH.

The computation means 210A are for example capable of computing the distance D1 using the equation $$D1 = \frac{(DP - RDP)}{\tan\gamma},$$

or $$D1 = \frac{(DH - RDH)}{\tan\gamma}$$

regarding the decision height DH, or $$D1 = \frac{(DA - RDA)}{\tan\gamma}$$

regarding the decision altitude DA.

They are capable of deducing a topographical distance D2 therefrom, corresponding to the topographical length of the front area 204 as a function of the approach distance D1.

This distance D2 is for example a multiple of the approach distance D1, for example comprised between 1 and 3, advantageously between 1.2 and 2, and for example equal to 1.5.

The second computation means 210B are capable of computing the length L of the front area 204 on the display 36 as a function of the topographical distance D2.

The length L corresponds to the length of the graphic representation of the front area 204 on the display 36 as a function of the topographical distance D2 and the position of the aircraft 12.

The front area 204 visible on the display 36 therefore has a length on the screen that depends on the approach distance D1, corresponding to the distance horizontally separating the runway threshold 212 from the theoretical position of the aircraft 12 in the vertical decision position DP.

The front area 204 also has a topographical half-width DC greater than or equal to the topographical half-width of the centered area 202, and advantageously greater than or equal to the sum of the topographical half-width of the centered area 202 and the width of a side area 208A, 208B.

In one embodiment, no real image of the terrain 16 obtained from the assembly 40 is displayed in the front area 204, in the rear area 206 and in the side areas 208A, 208B.

The pilot can transparently observe, through the display 36, the space situated in front of the aircraft in these areas.

In one alternative, the management means 58 of the display are capable of dynamically displaying, in the front area 204, in the rear area 206 and the side areas 208A, 208B, a real image obtained from the real image generating assembly 40.

Advantageously, the real image obtained from the generating assembly 40 is truncated to be displayed only in the centered area 202, and advantageously, in the side areas 208A, 208B and in the rear area 206. In that case, the peripheral area 200 has no real image display created by the generating assembly 40.

Alternatively, the real images created by the generating assembly 40 are displayed simultaneously in the centered area 202, in the side areas 208A, 208B, in the rear area 206, and additionally in the peripheral area 200. In this case, the synthetic images are displayed superimposed on the real images in the peripheral area 200.

Advantageously, the management assembly 42 further includes means 72 for controlling the display of symbols representative of flight parameters.

The control means 72 are for example capable of displaying alphanumeric information, analog information such as scales and/or controls to be actuated by the user.

The symbols are for example representative of at least one of the following parameters: altitude indicator, horizontal situation indicator, airspeed, altitude, vertical speed, corrected airspeed, engine information, lift configuration of the aircraft, etc.

In the example illustrated in FIG. 3, the control means 72 are capable of displaying, on the display 36, independently of the position of the areas 200 to 208B, a speed scale 90, an altitude scale 92, a symbol 94 or model representing the position of the aircraft 12 and its pitch attitude, a pitch attitude scale 96, a zero pitch attitude indicator 98, and a heading indicator 95.

According to the invention, the management assembly further includes means 218 for displaying symbols representative of the guide and approach elements toward the runway, such as a line 220, representing the axis of the runway.

The man-machine interface 44 preferably includes a member 102 for adjusting the brightness of the display of the synthetic image in the peripheral area 200, and optionally of the real image displayed in the areas 202 to 208B.

In one alternative, the man-machine interface 44 includes a member 104 for manually entering the vertical decision position DP, in the case where that position is not tabulated in a database 45A present in the assembly 38 and/or in the navigation system of the aircraft 12.

A first viewing method according to the invention will now be described in reference to the approach of an aircraft 12 toward a landing runway 18 located on a terrain 16.

Initially, when the system 10 is activated, the dimensions of the display 36 correspond to the observation volume 44A in the space situated in front of the aircraft 12, defined substantially by a pyramid or a cone.

At each update moment T of the display of the system 10, for example at a frequency above 5 Hz and comprised between 5 Hz and 60 Hz, the management assembly 42 advantageously controls the dynamic display of synthetic images coming from the synthetic image generating assembly 38 on the display 36.

To that end, the generating assembly 38 determines, at each moment T, the current position of the aircraft 12 based on data received from the positioning system 30. It dynamically generates a synthetic image representative of the terrain situated in the observation volume 44A in front of the aircraft. The synthetic image includes at least one synthetic surface representation of the terrain 16 situated facing the aircraft 12.

When the runway 18 enters an observation volume 44A, the management assembly 42 reads the topographical dimensions of the runway 18 in the database 45A and computes the dimensions and position of the centered area 202 on the display 36 on that basis.

Likewise, based on the dimensions of the runway, the management assembly 42 computes the position and topographical extent DB, DA of the peripheral areas 208A, 208B and the rear area 206, and determines their dimensions and positions on the display 36.

Then, the definition means 210 dynamically determine the length along the display 36 of the front area 206 situated in front of the runway.

The first computation means 210A query the database 45A to determine the vertical decision position DP (decision altitude DA or decision height DH) corresponding to the selected approach on the runway 18. Alternatively, the pilot manually enters this vertical decision position DP.

Next, in reference to FIGS. 4 and 6, the first computation means 210A determine the topographical approach distance D1 horizontally separating the runway threshold 212 and the projection 211A from the theoretical position 211B of the aircraft 12 in the vertical decision position DP, over a horizontal ray passing through the runway threshold 212.

This distance D1 is computed as a function of the vertical decision position DP, the desired descent slope γ, and the topographical position of the threshold 212 of the runway 18, and optionally the desired vertical reference position RDP at the threshold, and namely the reference altitude at the threshold RDA, or the reference height at the threshold RDH, for example using the equation:

$$D1 = \frac{(DP - RDP)}{\tan \gamma}.$$

Once this distance D1 is determined, the computation means 210A deduce the topographical distance D2 therefrom, for example by multiplying the distance D1 by a selected multiple, comprised between 1 and 3, and advantageously between 1.2 and 2.

Then, the second computation means 210B determine the length L of the front area 204 on the display 36, and its position, as a function of the computer distance D2, and the position of the aircraft 12.

The management assembly 42 then displays, at each moment T in the peripheral area 200, a synthetic image dynamically created by the generating assembly 38.

The management assembly 42 simultaneously maintains the centered area 202, the front area 204, and advantageously the side areas 208A, 208B and the rear area 206 free of any synthetic surface representation of the terrain 16.

In a first alternative, these areas 202 to 208B are maintained with no image.

The pilot then transparently observes, through the display 36, the terrain situated facing those areas, and particularly in the front area 204.

Alternatively, a real image obtained from image data taken by the real image generating assembly 40 is displayed in at least one of the areas 204 to 208B, and in particular in the front area 204.

Furthermore, a third region 65 situated above the first region 60, representative of the sky present above the terrain 16, may be less transparent, as a function of the attitude of the aircraft 12.

Owing to the invention described above, the length L of the front area 204 on the display 36 is chosen to be large enough so that the pilot can observe all of the details in that area, well before he reaches the vertical decision position. Thus, this length L is advantageously chosen to include the real vision of an approach ramp on the runway 18.

This allows him to actually perceive geographical indications on the position of the runway, as well as the guide means for landing, such as the lighted approach ramps. He may thus anticipate the information collection that will be necessary for the decision he must make at the decision height.

The length L of the front area is further chosen to be short enough to benefit from synthetic information in front of that area.

Subsequently, when he reaches the vertical decision position (decision height or altitude), the pilot already has useful information to ensure that he is indeed observing the runway and/or its surroundings, or on the contrary to go around if necessary.

In the configuration of FIG. 3, when the aircraft 12 is remote from the runway 18, the peripheral area 200 containing the synthetic image completely surrounds the areas 204 to 208B with no synthetic surface representation of the terrain 16.

On the contrary, when the aircraft approaches the runway 12, the extent of the areas 204 to 208B increases significantly, allowing the pilot to actually assess the surroundings of the runway 18 and his approach, without any bias from a synthetic image.

In one alternative, some particular elements situated in the peripheral area 200 may be left without any display of the synthetic image or have a real image displayed.

Conversely, the areas 202 to 208B may comprise a plurality of synthetic indicators, such as reference points, terrain lines obtained from the database 45A.

In another alternative, the opaqueness of the synthetic image displayed in the peripheral area 200 is less than 100%, and in particular comprised between 1% and 99%, to allow partial observation of the terrain situated behind the display 36.

In still another alternative, the display 36 of the vision system 10 according to the invention is chosen from among one or more head-down screens 24A to 24D. In that case, the management assembly 42 displays, in the second region, a real image provided by the real image generating assembly 40.

In the example shown in the figures, the peripheral area 200 containing the synthetic image and the areas 202 to 208B occupy the entire display 36, the peripheral area 200 surrounding the areas 204 to 208B.

Figure 8:
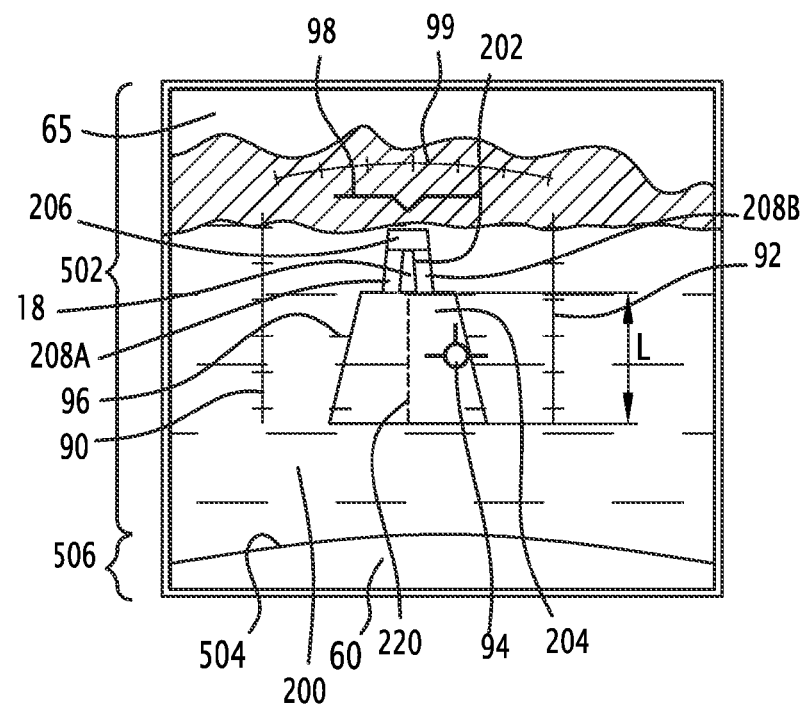
FIG. 8 is a view similar to FIG. 5, for an alternative embodiment of the method according to the invention, in an initial approach phase.
Figure 9:
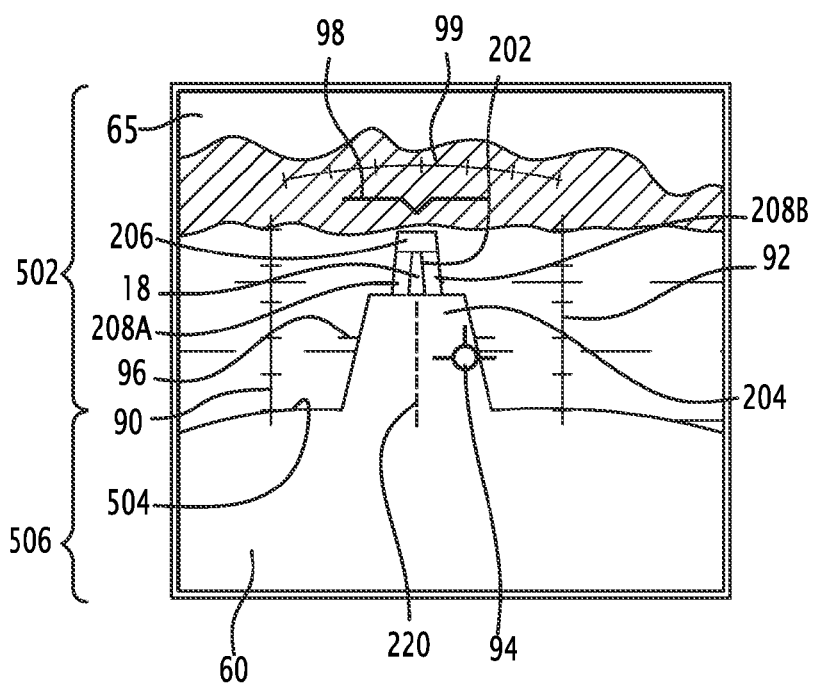
FIG. 9 is a view similar to FIG. 8 in a subsequent approach phase.

In the alternative illustrated in FIGS. 8 and 9, in at least certain configurations of the aircraft 12, these areas are positioned in a first region 502 of the display 36, delimited by an edge 504, a second region 506 of the display 36 delimited by the edge 504 being maintained with no synthetic surface representation display of the terrain 16 coming from the generating assembly 38.

Advantageously, the first region 502 situated above the second region 506 and the edge 504 of the first region 502 is a lower edge, the position of which may vary dynamically. A real image coming from the generating assembly 40 may be displayed in the second region 506, as illustrated in FIG. 8.

In FIG. 8, the edge 504 of the first region 506 is situated below and completely separated from the front area 204.

Then, near the runway 18 (FIG. 9), the front area 204 may be at least partially consumed by the second region 506, thereby defining an area with no synthetic image display in the shape of an upside down T.

While the foregoing is directed to embodiments of the present invention, other and further embodiments of the invention may be devised without departing from the basic scope thereof, and the scope thereof is determined by the claims that follow.

The invention claimed is:

1. A vision system for an aircraft, comprising: a display; a synthetic image generator configured for dynamically generating synthetic images, the synthetic images comprising at least one synthetic surface representation of the terrain situated facing the aircraft; a graphic interface manager for a graphic interface of the display, being configured to control the display, on at least a first region of the display, of a peripheral area formed from the synthetic image comprising at least one synthetic surface representation of the terrain coming from the synthetic image generator; the graphic interface manager being configured to maintain at least one centered area representative of a position of a landing runway, centered on the landing runway and at least one front area, adjacent to the centered area, free from the synthetic image comprising at least one synthetic surface representation of the terrain, the peripheral area extending at least partially around the centered area and/or the front area, the graphic interface manager including a defining unit configured for dynamically defining a length of the front area of the display as a function of a vertical decision position associated with a chosen approach for said landing runway, wherein the vertical decision position is a decision height or a decision altitude.

2. The system according to claim 1, further comprising at least one database associating each approach on each landing runway from among a plurality of approaches over a plurality of landing runways with a vertical decision position corresponding to each said approach on each said landing runway, the defining unit being configured to collect information relative to the vertical decision position associated with said chosen approach on said landing runway situated facing the aircraft, from the database.

3. The system according to claim 1, wherein the graphic interface manager is configured for keeping at least one side area and at least one rear area situated around the centered area free from the synthetic image comprising at least one synthetic surface representation of the terrain.

4. The system according to claim 1, wherein the front area has a larger width than the width of the centered area.

5. The system according to claim 1, further comprising a real image generator configured for generating real images of the terrain situated facing the aircraft, comprising at least one detection sensor, the graphic interface manager being configured to control a dynamic display, in the front area and/or the centered area, of the real image of the terrain situated facing the aircraft, simultaneously with the display of the synthetic image comprising at least one synthetic surface representation of the terrain in the peripheral area.

6. The system according to claim 5, wherein the graphic interface manager is configured to maintain the peripheral area free from the real images of the terrain situated facing the aircraft created by the real image generator.

7. The system according to claim 1, wherein the graphic interface manager is configured to maintain, in certain movement configurations of the aircraft, a second region of the display delimited by an edge of the first region, free from the synthetic image comprising at least one synthetic surface representation of the terrain.

8. The system according to claim 1, wherein the display is an at least partially transparent display.

9. The system according to claim 8, further comprising an opaqueness adjuster configured for adjusting the opaqueness of the display.

10. The system according to claim 1, wherein the defining unit is configured to dynamically define the length of the front area of the display based on a numerical value of the vertical decision position associated with the chosen approach for said landing runway.

11. The system according to claim 1, wherein the display is a semitransparent screen placed in front of a windshield of the cockpit, a projector for projecting images on a windshield of the cockpit, a semitransparent sunshade, a helmet visor or semitransparent glasses close to an eye.

12. A vision method in an aircraft, comprising providing a vision system comprising:
  a display;
  a synthetic image generator configured for dynamically generating synthetic images, the synthetic images comprising at least one synthetic surface representation of the terrain situated facing the aircraft;
  a graphic interface manager for a graphic interface of the display, being configured to control the display, on at least a first region of the display, of a peripheral area formed from the synthetic image comprising at least one synthetic surface representation of the terrain coming from the synthetic image generator;
  the graphic interface manager being configured to maintain at least one centered area representative of a position of a landing runway, centered on the landing runway and at least one front area, adjacent to the centered area, free from the synthetic image comprising at least one synthetic surface representation of the terrain, the peripheral area extending at least partially around the centered area and/or the front area,
  the graphic interface manager including a defining unit configured for dynamically defining a length of the front area of the display as a function of a vertical decision position associated with a chosen approach for said landing runway, wherein the vertical decision position is a decision height or a decision altitude;
the method comprising:
using the graphic interface manager to display, in at least the first region of the display, in the peripheral area, the synthetic image comprising at least one synthetic surface representation of the terrain coming from the synthetic image generator, the at least one centered area representative of the position of the landing runway, centered on the landing runway and the at least one front area, adjacent to the centered area, free from the synthetic image comprising at least one synthetic surface representation of the terrain; and
dynamically defining the length of the front area on the display as the function of the vertical decision position associated with the chosen approach of said landing runway.

13. The method according to claim 12, further comprising using the defining unit for collecting the vertical decision position associated with said landing runway from at least one database, the database associating a vertical decision position with each approach on each landing runway from among a plurality of approaches on a plurality of landing runways.

14. The method according to claim 12, wherein the step for dynamically defining the length of the front area on the display includes computing an approach distance horizontally separating the aircraft, at the vertical decision position associated with the chosen approach, from the landing runway, and computing the length of the front area on the display as a function of the computed approach distance.

15. The method according to claim 12, further comprising acquiring real image data by at least one real image generator, then generating a real image from the real image data acquired by the real image generator, the method including displaying, by the graphic interface manager, the real image obtained from the real image generator in the centered area and/or in the front area.

16. The method according to claim 15, further comprising the graphic interface manager maintaining, in certain movement configurations of the aircraft, a second region of the display delimited by an edge of the first region, free from the synthetic image comprising at least one synthetic surface representation of the terrain.

17. A vision system for an aircraft, comprising:
  a display;
  a synthetic image generator configured for dynamically generating synthetic images, the synthetic images comprising at least one synthetic surface representation of the terrain situated facing the aircraft;
  a graphic interface manager for a graphic interface of the display, being configured to control the display, on at least a first region of the display, of a peripheral area formed from the synthetic image comprising at least one synthetic surface representation of the terrain coming from the synthetic image generator;
  the graphic interface manager being configured to maintain at least one centered area representative of a position of a landing runway, centered on the landing runway and at least one front area, adjacent to the centered area, free from the synthetic image comprising at least one synthetic surface representation of the terrain, the peripheral area extending at least partially around the centered area and/or the front area, the graphic interface manager including a defining unit configured for dynamically defining a length of the front area of the display as a function of a vertical decision position associated with a chosen approach for said landing runway, wherein the vertical decision position is a decision height or a decision altitude, and wherein the defining unit for dynamically defining the length of the front area on the display computes a topographical distance as a function of a topographical approach distance, the topographical approach distance horizontally separating the aircraft, at the vertical decision position corresponding to said chosen approach, from the landing runway, and computes the length of the front area on the display as a function of the topographical distance.

\* \* \* \* \*